United States Patent [19]

Sedy

[11] Patent Number: 4,921,015
[45] Date of Patent: May 1, 1990

[54] ROTARY VACUUM VALVE

[75] Inventor: Josef Sedy, Singapore, Singapore

[73] Assignee: John Crane, Inc., Morton Grove, Ill.

[21] Appl. No.: 383,003

[22] Filed: Jul. 21, 1989

[51] Int. Cl.⁵ .................. F16K 25/00; F16K 29/00
[52] U.S. Cl. .................. 137/625.11; 251/161; 251/180
[58] Field of Search ............. 137/625.11; 251/160, 251/161, 175, 180, 187

[56] References Cited

U.S. PATENT DOCUMENTS

| | | | |
|---|---|---|---|
| 2,751,034 | 6/1956 | Ringo et al. ............. | 137/625.11 X |
| 2,918,938 | 12/1959 | Kimball ................... | 137/625.11 |
| 3,554,224 | 1/1971 | Kirk et al. ............... | 137/625.11 X |
| 4,156,437 | 5/1979 | Chivens .................. | 251/161 X |
| 4,509,555 | 4/1985 | Stirbis .................... | 137/625.11 |
| 4,564,043 | 1/1986 | Trittler ................... | 251/160 X |

Primary Examiner—John Rivell
Attorney, Agent, or Firm—Kinzer, Plyer, Dorn, McEachran & Jambor

[57] ABSTRACT

Indexing rotary vacuum valve in which second stage vacuum at torr $p_i$ is applied through aligned ports of one valve member juxtaposed to another, originating a force tending to bring the two tightly together, but wet lubrication is not needed since gas under supra atmospheric pressure is admitted to an interface chamber in the lower valve member lifting the upper one to establish a slight clearance, sealed against ingress of atmospheric pressure. First stage vacuum at torr $p_o$ greater than $p_i$ is applied at the interface around the vacuum ports, to prevent leakage of the second stage vacuum.

10 Claims, 3 Drawing Sheets

ROTARY VACUUM VALVE

This invention relates to a rotary indexing multiport dry running two stage vacuum valve.

SUMMARY OF THE INVENTION AND COMPARISON TO PRIOR ART

The structure is such that vacuum is drawn on hollow bodies connected to each of many vacuum ports located on a rotary valve member. Vacuum lines communicated to each of the vacuum ports are located on a stationary valve member. A vacuum may be drawn on the hollow bodies by aligning vacuum ports on the rotary valve (rotor) with vacuum ports on the stationary valve (stator) assembly. This vacuum is referred to as the second stage vacuum, $p_i$.

The rotary valve member indexes from one port on the stator to the next vacuum port. While the rotary valve is indexing, the vacuum ports of the stationary valve member will no longer be in line with the vacuum ports of the rotary valve thereby cutting off the vacuum supply to each hollow body to be evacuated. However, a sealing strip located within the stationary valve member will seal off the vacuum ports of the rotary valve, thereby maintaining the vacuum a level (e.g. 0.001 torr to 0.005 torr) while the rotary valve is indexing.

While the second stage vacuum is drawn through the vacuum ports, a first stage vacuum $p_o$, is drawn through a pair of vacuum recesses located at the O.D. and the I.D. of the sealing strip. The purpose of the first stage vacuum is to reduce the pressure at the O.D. of the sealing strip from atmospheric conditions (760 torr or 14.7 psia) to 0.003 torr for example, thereby greatly decreasing the pressure drop ($p_o - p_i$) across the sealing interface. This will result in reduced vacuum leakage across the sealing interface during indexing of the rotary valve.

Two pressure chambers within the rotor are sealed by using expansible seals. Any ambient pressure leakage across the expansible seals toward the first stage vacuum recesses will be evacuated via evacuation holes which are connected to the first stage vacuum recesses, drawing first stage vacuum $p_o$.

The pressure within the pressure chambers (supra atmospheric) acts to separate the stationary valve assembly from the rotary valve and thus imparts dry running capability. The first stage vacuum and second stage vacuum, on the other hand, will act to pull them together. Therefore, the pressure chambers will be pressured such that the force acting to separate the stationary valve from the rotary valve will be lower than the force pulling them together due to vacuum. The difference in the two forces will be referred to as the "face load." The face load can be controlled by adjusting the pressure within the two pressure chambers. By maintaining a low face load, the friction between the sealing strip and the rotary valve will remain low. This will prolong the wear life of the vacuum valve.

Nitrogen may be used for the first stage and second stage valve vacuums and also to pressurize the two pressure chambers. The dry running capability of the valve eliminates the possibility of oil contamination in the members or units being evacuated.

In comparison to the present invention, a single stage vacuum valve depends on an oil film between the fixed valve and the rotating valve to reduce sliding friction and to prolong wear life. The oil is hydrostatically applied via ports located on the fixed valve. Two holes are connected to each port. At the end of each hole is a radial slot which is located on the sealing surface of the fixed valve. The oil is then hydrostatically applied to the sliding surfaces as the rotating valve rotates. There is no barrier between the lubricating oil and the single stage vacuum. Therefore, oil contamination within a single stage vacuum is common and this results in a mist of oil being fed to the vessel being evacuated. This cannot occur under the present invention.

Thus, the present structure embodies two unique features distinguishing from the prior art. First, the two stage vacuum system drastically reduces leakage across the sealing interface. Second, the dry running construction eliminates the need for oil lubrication between the valve members.

PREFERRED EMBODIMENT

Figure 1:
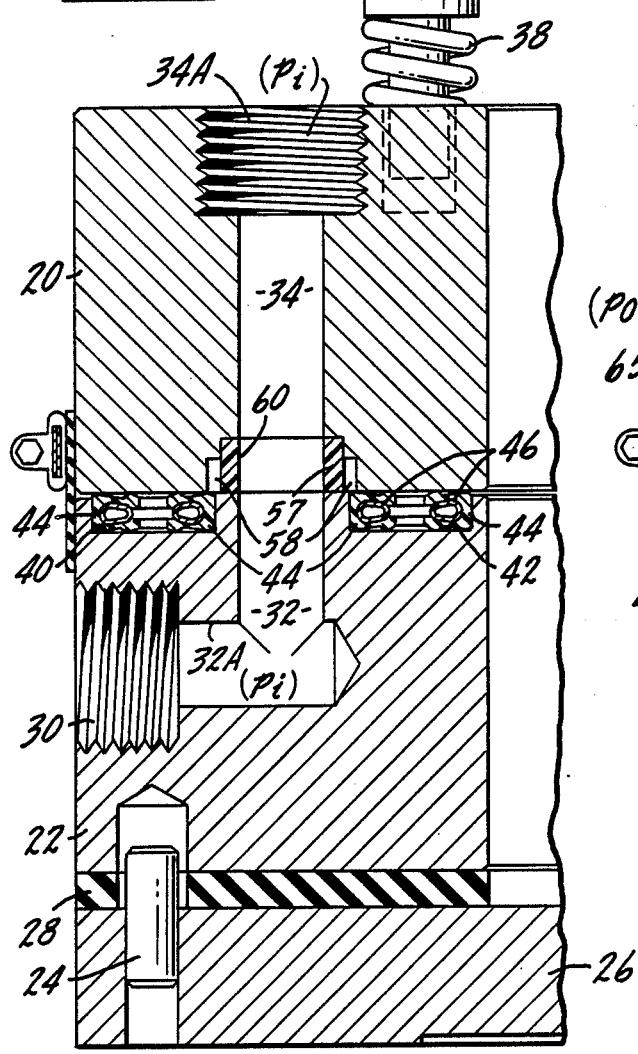
FIG. 1 is a fragmentary sectional view on the line 1—1 of FIG. 7.
Figure 7:
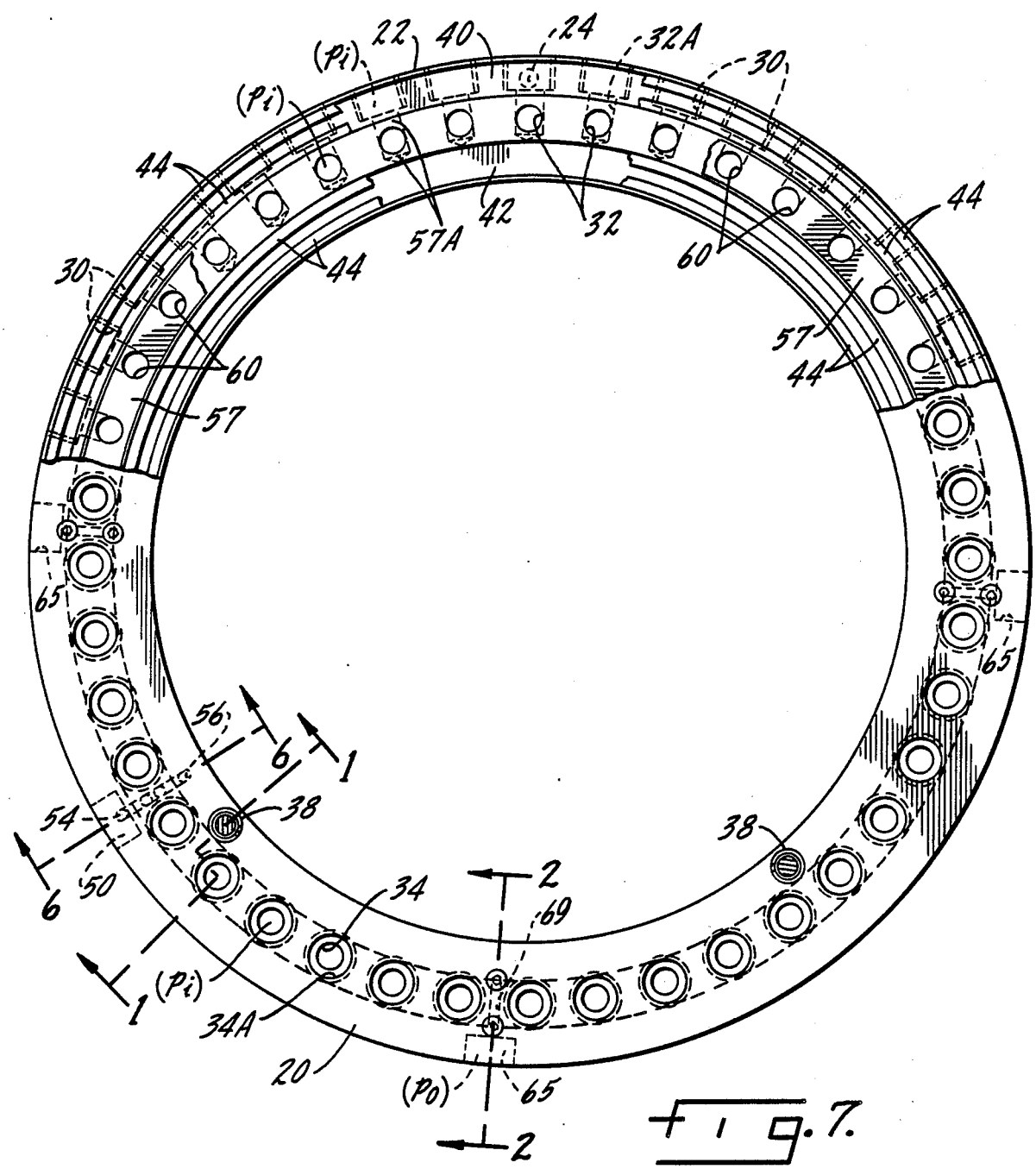
FIG. 7 is a plan view of the valve assembly with the upper valve member partly broken away and the seals (44) partly broken away to show features of the assembly.

The principals of the invention are best explained in the first instance on the basis of views presented by FIGS. 1-6, while bearing in mind that the two valve members 20 and 22, FIG. 1, are large rings as can be visualized from the plan views of FIG. 7.

Valve member 20 in the form herein described is stationary, being pinned to an upper cover plate, not shown. The lower valve member 22 is a rotor, joined by drive pins 24 to a rotary indexing table 26. A pad 28 of resilient material is interposed between the opposed faces of the indexing table and valve rotor to compensate for machining deformations of the opposed faces, impossible to prevent.

In operation, hollow bodies or vessels to be evacuated are supported in a ring array about the outer circumference of the valve rotor. These bodies may be halogen lamp bulbs, laboratory vials, pharmaceutical bottles and other kinds of air-tight vessels to be vacuumized and subsequently filled with another fluid. Subsequent action is no part of the present invention, nor the form of the vessel.

To mount the vessels to be evacuated, regularly spaced openings 30 are formed in the outer circumference of the rotor and these openings are threaded or otherwise adapted to enable the vessel to be attached air-tight thereto. When the rotor is indexed, vacuum is communicated to each attaching opening 30 and the attached vessel is evacuated in successive index stages. In the form shown, there are forty such openings, enabling the desired value of high vacuum (negative pressure) to be achieved. Depending upon the nature of the vessel and intended utility, the number of stages can, of course, vary.

The opposed inner surfaces of the rotor and stator are provided with circumferentially spaced matching ports 32 and 34, communicating at the index positions but sealed when not matching, that is, the ports 32 and 34 are not matched while making a short transit from one index position to the next. A source of vacuum, as will be explained, is connected to the ports 34 of the stator. Ports 32 in the rotor communicate with the attaching openings 30 by a passage 32A.

The ports 34 in the stator are each extended axially from the inner annular face of the stator to an enlargement 34A at its annular outer face, to which the source of negative pressure is communicated by attached vacuum lines, not shown. This negative pressure, transmitted to the vessels at the attaching positions on the rotor, when the ports are aligned, is termed herein the second stage vacuum $p_i$, and may range from 0.001 torr to 0.005 torr.

The upper valve member is quite heavy (e.g. a 22" O.D.) but none the less, in the static state especially, the valve members are urged toward face-to-face closing engagement by strong springs as 38 (preferably four springs) acting on the upper or outer surface of the stator to apply a closing force. The vacuum which is drawn results in a strong force tending to force the valve members together.

Two annular, continuous pressurizing chambers 40 and 42 are formed in the seal face of the rotor. Recess 40 is adjacent the O.D. of the rotor and recess 42 is adjacent the I.D. In each pressurizing chamber there are a pair of annular U-shaped elastomeric Teflon seals 44 expanded (spread apart) by an expansion band or spring 46 positioned concentrically within the open sides of the seals 44. These seal assemblies are known as spring-energized TFE lip seals.

The seals 44, U-shaped and fitted as shown with their inner diameters or mouths spaced from but facing one another within the pressurizing recesses, will expand outwardly toward the seal face of the stator, due to the built-in spring action, into the recesses 40 and 42. To reduce or alleviate contact or excessive closing force of the upper valve member on the lower due to high vacuum, air is admitted to the chambers 42. To this end, FIG. 6, the stator is provided with an inlet 50 for gas $P_R$ under high pressure which may be 50 psi. for example or whatever may be necessary to provide the slight lifting force. The inlet has an in-leading passage 52 of reduced diameter; passages 54 and 56 lead therefrom to the respective pressurizing chambers 40 and 42. This pressurizing porting is also shown in FIG. 7.

By pressurizing the chambers 40 and 42, a slight lift is imparted to the stator in opposition to its weight, the closing force created by the vacuum ($p_i$) and the springs 38. The lift is sufficient so that the Teflon strips (57, described below) have a slight contact with the top of the ring 22, allowing the seal faces to run dry. Atmospheric (ambient) pressure $p_a$ prevails at the O.D. of the seal, FIG. 3.

Figure 3:
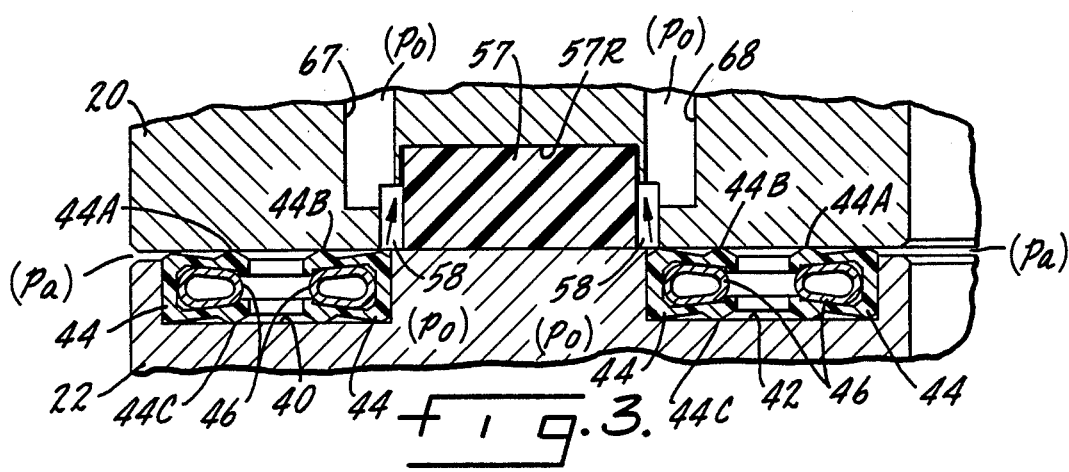
FIG. 3 is an enlargement of a portion of FIG. 2.

The upper faces of the seals 44 are provided with annular ribs or ridges 44A, 44B, FIG. 3, opposed to the seal face of the stator and are sealingly engaged therewith especially when the chambers are pressurized, sealing the O.D. of the valve members (where ambient pressure prevails) and affording a low friction run at the same time. Thus the arrangement presents a dry low friction seal between the two valve members.

Figure 2:
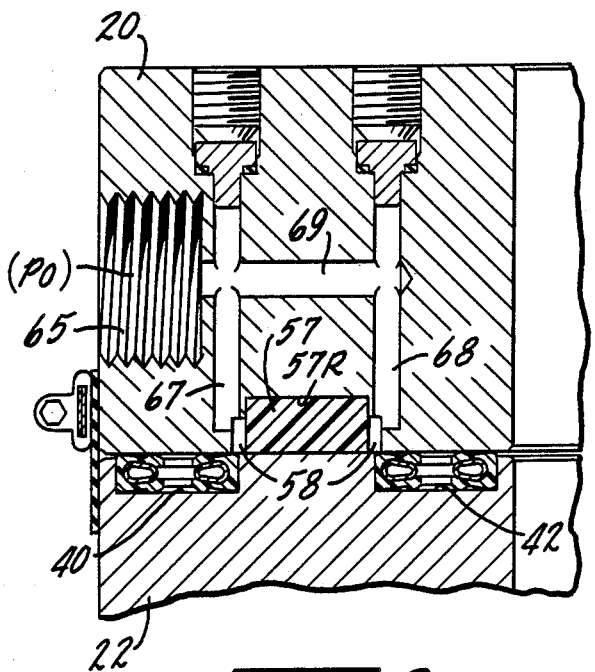
FIG. 2 is a fragmentary sectional view on the line 2—2 of FIG. 7.

The ports 32 and 34 which communicate second stage pressure $p_i$ must be sealed when these ports are not aligned, which occurs during the short period of time that relative indexing is taking place. To accomplish this, an annular intermediate seal strip 57 of Teflon, FIG. 2, is bonded in a complemental recessed seat 57R in the sealing face of the stator, intermediate the two pressurizing chambers 40 and 42. The rear or upper face of the strip 57 is preferably etched to assure a good cement bond. The bottom of the recessed seat 57R is of the same lateral width of the strip 57 but there beyond is enlarged to define two radially spaced annular recesses or chambers 58 in the stator. As best shown in FIG. 3, these chambers 58 open at the seal face of the stator around the intermediate seal strip 57 and at the same time communicate with the recesses 40 and 42 in which the dry running lubricating seals 44 are housed. The reason for this will be explained, but it may be mentioned at this point that there are ribs 44C on the seals 44 at the under side to seal the chambers 40 and 42 against atmospheric ingress ($p_a$), FIG. 3, and loss of pressure in recesses 40 and 42 at the same time.

Figure 4:
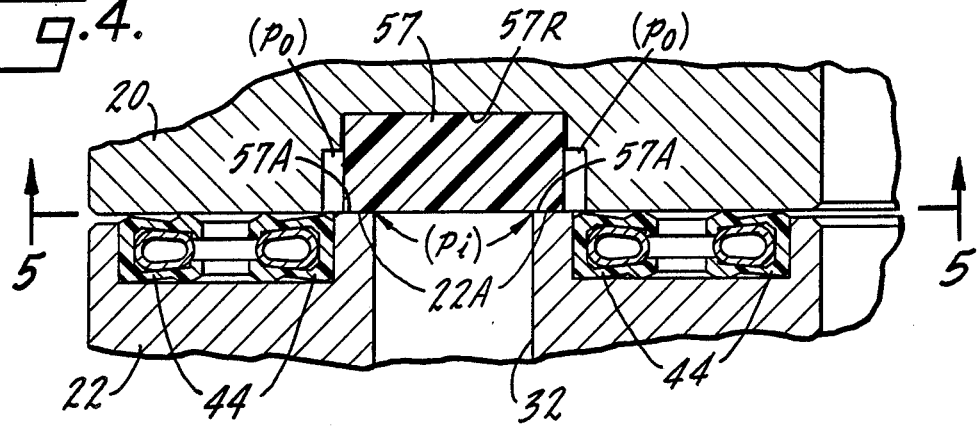
FIG. 4 is an enlargement of a portion of FIG. 1.
Figure 5:
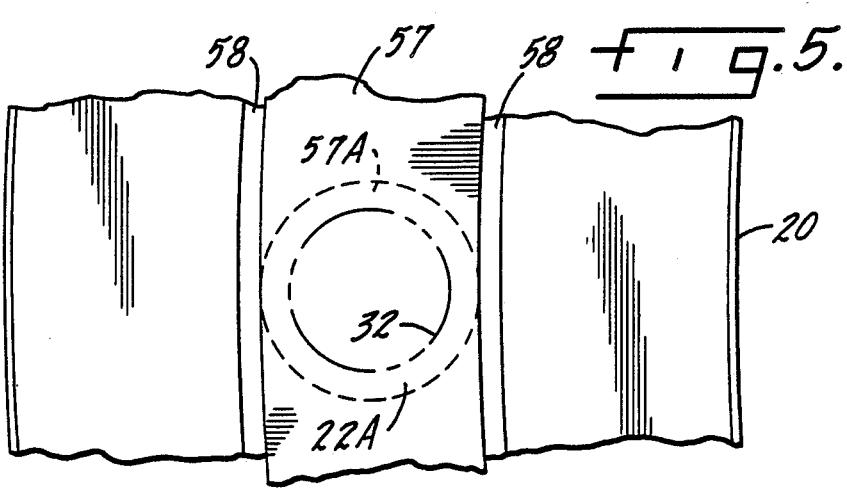
FIG. 5 is a fragmented plan view on the line 5—5 of FIG. 4.
Figure 6:
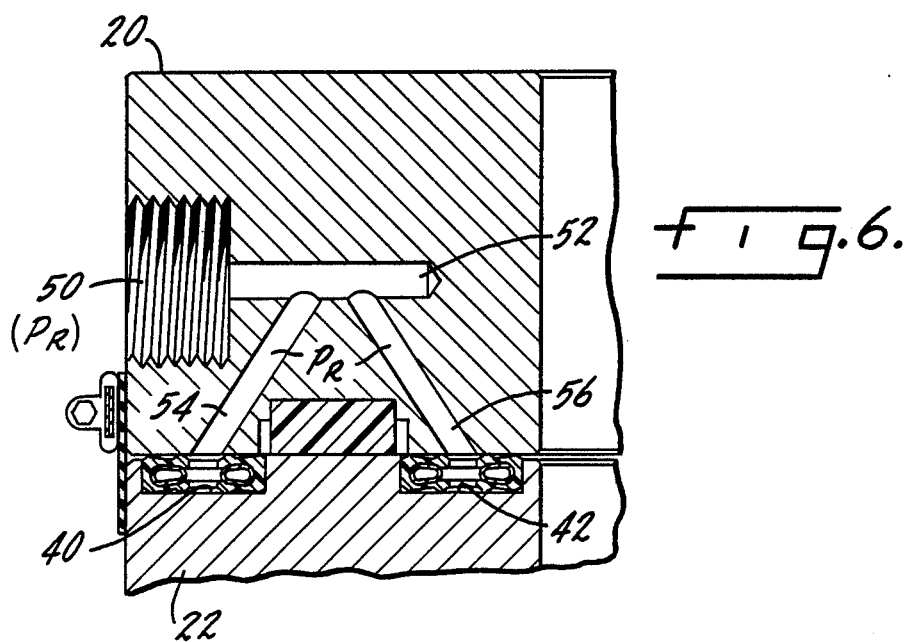
FIG. 6 is a fragmentary sectional view on the line 6—6 of FIG. 7.

The seal strip 57 has ports 60, FIG. 1, numbering the same and spaced the same as the ports 34. In fact, the seal strip 57 is so bonded to the stator ring as to assure the ports 60 are matched to the stator ports 34. Hence at any index position, FIG. 1, second stage vacuum is transmitted across the walls of each port 60, but in between the index positions the unported or solid segments of the seal strip 57 prevent communication between the ports 32 and 34. Hence the interior of the vessel being evacuated is sealed against ingress of atmospheric pressure. In other words, the seal strip 57, between index positions, results in a dead end for each port 32, at the end thereof which is flush with the seal face of the rotor. Also, as best shown in FIG. 4, the seal strip 57 is of such lateral width in cross-section as to provide a pair of sealing annuli 57A at the I.D. and O.D. thereof. These annuli interdict and are interposed radially between the chambers 58 and the ring of vacuum ports.

Each sealing annulus 57A of the sealing strip 57, FIG. 4, is in sealing contact with the opposed rotor annulus 22A surrounding the ports 32 of the rotor, such surface-to-surface contact at 22A-57A representing a sealing interface radially between the chambers 40, 42 and the vacuum ports for preventing leakage of second stage pressure $p_i$ prevailing at the vacuum ports. Some leakage of the ambient air ($p_a$, 760 torr, 14.7 psia) is unavoidable, but to enable this interface seal to be highly effective a first stage vacuum pressure $p_o$ near to the value of vacuum pressure $p_i$ (torr values) is created in the two chambers 58, FIG. 2. To this end, inlets 65 are formed in the outer circumference of the stator, allowing vacuum lines to be connected thereto. As shown in FIG. 7, there are four inlets 65 and in each instance the vacuum thus created is communicated by passages 67 and 68 respectively communicating at one end with each of the chambers 58 ($p_o$) and at the other end to a header 69 which opens into the related inlet 65.

The sealing interface also interdicts ambient leakage $p_a$ to $p_o$.

If the second stage pressure $p_i$ is 0.001 torr, the first stage pressure $p_o$ could be about 0.003 torr, for example, decreasing the pressure drop ($p_o - p_i$) across the sealing inner face from 759.009 torr (atmospheric) to 0.002 torr, resulting in reduced vacuum leakage across the sealing interface 22A-57A during indexing. Any $p_a$ leakage across the seals 44 is taken up so to speak in chambers 58.

It will be seen from the foregoing that when the vacuum ports are aligned at an index position, second stage vacuum of value $p_i$ (in the range 0.001 torr./0.005 torr) is communicated from the inlet 34A to the attachment opening or port 30. Each port 32, FIG. 4, at this time is surrounded by the sealing interface 57A-22A and leakage across the interface is opposed by a first stage higher pressure value $p_o$ within the two chambers 58 separated by the intermediate seal ring or strip 57.

The pressure difference $p_o - p_i$ need not be great, enough to prevent leakage and in this connection it will be noted that $p_i$ is the pressure at the I.D. of the sealing interface while $p_o$ is the pressure at the O.D.

The equation governing leakage across a narrow gap is complicated but one factor is $(p_o^2 - p_i^2)$. If $p_o$ is atmospheric (760 torr) the factor is $(760^2 - 0.001^2) = 577,600$, characterizing a considerable tendency to reduce the vacuum $p_i$. If $p_o$ is 0.003 torr, and $p_i$ 0.001 torr, the factor is only $8 \times 10^{-6}$, characterizing very little chance of reducing the effectiveness of $p_i$.

While the rotary valve is indexing, the vacuum ports of the stationary valve assembly will no longer be in line with the vacuum ports of the rotary valve thereby cutting off the vacuum supply to each outlet 30. However, the sealing strip 57 located within the stationary valve assembly will seal the vacuum ports of the rotary valve, thereby maintaining the vacuum level within each vessel being subjected to vacuum while the rotary valve is indexing.

No lubrication is required to ease rotation. The valve runs dry and this is made possible by admitting gas under pressure to the annular pressurizing chambers 40 and 42 located radially outward of the ring of vacuum ports. The pressure inside these chambers is communicated to and reduces an excessive closing force due to vacuum between the valve rings 20 and 22. The seals 44, as mentioned, FIG. 3, have ridges or ribs 44A and 44B which make line contact with the opposed sealing face of the stator. The amount of pressure required to "lift" the stator is a mere matter of calculation of which the more significant factors are the weight of the stator, the closing force of the springs 38 and especially the force due to vacuum which tends to urge the stator and rotor tightly together. The spring force, the force due to vacuum, the weight of the upper ring 22 and the lifting force can be easily calculated and adjusted to achieve an increased wear life while sealing the interface 22A-57A.

An example has been given of $p_o = 0.003$ torr and $p_i = 0.001$ torr, that is $p_o$ is near to (but a little greater than) $p_i$ and therefore leakage is from $p_o$ inward to $p_i$. However, the leakage direction can be reversed ($p_i$ outward to $p_o$) by having the value of $p_i$ greater than $p_o$. The essential case is, in any event, that the vacuum ports 32 be sealed by surrounding them, FIG. 5, with a source of primary vacuum $p_o$, and that $p_o$ be near to (slightly more or slightly less) than $p_i$.

Hence while a preferred form of the invention has been illustrated and described, it is to be understood that this is capable of variation and modification within the purview of the appended claims.

I claim:

1. A rotary indexing multiport dry running two stage vacuum valve having a stationary valve member (stator) and a rotary valve member (rotor) in face-to-face opposed relation, wherein a source of second stage vacuum at pressure torr $p_i$ is to be communicated from a set of circumferentially spaced vacuum ports in ring array on the stationary valve member to a set of identically spaced circumferential vacuum ports located in ring array on the rotary valve member as the opposed ports are aligned during indexing, a pair of annular expansible dry, low friction seals located in pressurizing chambers in the rotor and interposed between the opposed faces of the valve members radially outward of the rings of ports, means to apply gas under pressure to said chambers to slightly lift the stator to reduce running friction between the opposed faces of the valve members, an intermediate sealing ring secured to the stationary valve member, said intermediate sealing ring having circumferentially spaced ports, mated to and matching the ports of the stationary valve member, the areas between the ports of the intermediate sealing ring interdicting and sealing communication between the valve member ports when not aligned during indexing, the stationary valve member having a pair of annular recesses surrounding both the O.D. and I.D. of the intermediate sealing ring, a pair of sealing annuli presented by the intermediate sealing ring radially between the valve member ports and the two annular pressurizing chambers and also defining a sealing interface between the valve member ports and the two annular recesses, and passage means to communicate first stage vacuum pressure, at pressure torr $p_o$ near to $p_i$, to said annular recesses in the stator.

2. A vacuum valve according to the claim 1 in which the intermediate seal ring is of uniform cross section width, said stator having a seating recess affording a seat which has substantially the same width as the intermediate seal ring, and said seating recess being enlarged radially on both sides of the intermediate seal ring to define the two annular recesses in the stator which receive pressure $p_o$.

3. A vacuum valve according to claim 1 in which the expansible seals are U-shaped and have narrow ribs on the surface thereof opposed to and engaged with the opposing face of the stator to preclude ingress of ambient air from the outer diameter of the valve members.

4. A valve according to claim 2 in which the expansible seals are U-shaped and have narrow ribs on the surface thereof opposed to and engaged with the opposing face of the stator to preclude ingress of ambient air from the outer diameter of the valve members.

5. In a rotary vacuum valve assembly including a rotor member and stator member, one juxtaposed on the other to impress its weight thereon and thereby tending to produce a tight interface between the opposed surfaces of the seal members, said tight interface being further tightened when vacuum is drawn, the lower one of said seal members having an annular pressurizing chamber therein occupied by an annular expansible seal ring, passage means to admit gas under pressure to said pressurizing chamber to exert a slight lifting force to the upper one of the valve members resulting in a small clearance between the valve members at their interface, and said expansible seal ring expanding into said clearance space, whereby the valve members may be relatively rotated in a dry running condition without need for lubricating the interface.

6. Vacuum valve assembly according to claim 5 wherein the valve members are relatively rotatable from one index position to another and wherein one of the valve members has mounting openings to which vessels to be evacuated may be attached, said valve members having circumferentially spaced vacuum applying ports in alignment at each index position, and said expansible ring seal surrounding the vacuum ports.

7. Vacuum valve assembly according to claim 6 wherein the upper one of the valve members is provided with a pair of annular recesses respectively radially inward and outward of the vacuum ports in the lower valve member, said annular recesses opening at the interface between the valve members, a pair of intermediate sealing annuli supported by the upper valve member and interposed radially between the annular recesses and the vacuum ports to define a pair of annular sealing faces respectively between the annular recesses and said vacuum ports, passage means to communicate first stage vacuum at torr pressure $p_i$ to said vacuum ports when aligned, and passage means to communicate second stage vacuum to said annular recesses at torr pressure $p_o$ greater than $p_i$.

8. Vacuum valve assembly according to claim 7 wherein the expansible seal ring is radially outward of and surrounds said annular recesses.

9. In a rotary indexing multiport vacuum valve which includes a rotor valve member and a stator valve member in face-to-face opposed sealing relation and wherein the valve members have equally spaced vacuum ports in alignment at each indexed position to enable vacuum from a source to be transmitted to hollow bodies to be evacuated, a two stage vacuum system to prevent leakage of vacuum comprising:

an intermediate seal fastened to one of the valve members and having spaced apart ports therein matching said vacuum ports at each index position to permit vacuum to be transmitted;

passage means to pass second stage vacuum at torr pressure $p_i$ to the ports of said stator, said rotor and said seal at the time of alignment;

the solid portions of said intermediate seal strip between the ports thereof being positioned between the vacuum ports of the valve member to which the seal strip is not connected at the time of an indexing movement thereby to hold the vacuum in the vessel being evacuated;

one of said valve members having a pair of annular recesses surrounding the O.D. and I.D. of the intermediate seal strip and means for communicating first stage vacuum at torr pressure $p_o$ near $p_i$ to said surrounding annular recesses; and an annular seal located radially outward of each of the annular recesses to prevent ingress of ambient pressure thereto.

10. Rotary indexing vacuum valve according to claim 9 wherein said annular recesses are in the upper valve member, opening of the seal face thereof, and wherein the lower valve member radially outward of said annular recesses is provided with a pressurizing chamber in which is positioned an expansible seal ring, and passage means to admit gas under supra atmospheric pressure to said pressurizing chamber slightly to lift the upper valve member, affording slight clearance space to reduce running friction and to allow expansion of said seal ring to seal said clearance space.

* * * * *